(12) United States Patent
Johnson

(10) Patent No.: US 10,657,398 B2
(45) Date of Patent: May 19, 2020

(54) SLEEPY DRIVER ALERT SYSTEM AND METHOD

(71) Applicant: David Johnson, Round Rock, TX (US)

(72) Inventor: David Johnson, Round Rock, TX (US)

( * ) Notice: Subject to any disclaimer, the term of this patent is extended or adjusted under 35 U.S.C. 154(b) by 0 days.

(21) Appl. No.: 16/018,273

(22) Filed: Jun. 26, 2018

(65) Prior Publication Data

US 2019/0392234 A1    Dec. 26, 2019

(51) Int. Cl.
*G06K 9/00* (2006.01)
*G08B 21/06* (2006.01)
*B60K 28/06* (2006.01)
*B60W 50/14* (2020.01)
*B60W 40/08* (2012.01)

(52) U.S. Cl.
CPC ........ *G06K 9/00845* (2013.01); *B60K 28/066* (2013.01); *G08B 21/06* (2013.01); *B60W 2040/0827* (2013.01); *B60W 2050/143* (2013.01)

(58) Field of Classification Search
CPC ... G06K 9/00845; B60K 28/066; G08B 21/06
See application file for complete search history.

(56) References Cited

U.S. PATENT DOCUMENTS

| | | | | |
|---|---|---|---|---|
| 2012/0179008 A1* | 7/2012 | Burton | ..................... | A61B 5/18 |
| | | | | 600/301 |
| 2016/0046298 A1* | 2/2016 | DeRuyck | .............. | B60W 40/09 |
| | | | | 340/576 |
| 2017/0248950 A1* | 8/2017 | Moran | ................... | G08G 1/165 |
| 2017/0364070 A1* | 12/2017 | Oba | ....................... | B60W 50/08 |

\* cited by examiner

*Primary Examiner* — Curtis B Odom
(74) *Attorney, Agent, or Firm* — Richard Eldredge

(57) ABSTRACT

A sleepy driver alert method includes providing a platform accessible from a computing device, the platform being able to communicate with one or more sensors; monitoring driver posture via a first sensor in communication with the platform; monitoring vehicle swaying via a second sensor in communication with the platform; determining if driver posture is within a pre-determined normal range; determining if vehicle swaying is within a pre-determined normal range; and providing an alert via a list of alerts to increase awareness of the driver when the driver posture or the vehicle swaying is not within the predetermined normal ranges.

6 Claims, 3 Drawing Sheets

SLEEPY DRIVER ALERT SYSTEM AND METHOD

BACKGROUND

1. Field of the Invention

The present invention relates generally to driving systems and methods, and more specifically, to a sleepy driver alert system for providing one or more alerts to a driver upon the detection of an indicator that the driver is becoming sleep/unalert.

2. Description of Related Art

Driving methods and systems are well known in the art and are effective means to transport people and cargo from one location to another. One problem commonly associated with driving is the tendency of drivers to become sleepy/tired and therefore they become dangerous to have on the road. For example, FIG. 1 depicts a conventional driving method 101, wherein the driver begins a drive, as shown with box 103. As the driver becomes tired, it is common for the driver to continue the trip, as shown with boxes 105, 107. In the best case scenario, the driver will pull over and rest until they are once again alert and safe to drive, as shown with box 109. However, in many situations the driver may continue the trip too long, and possibly cause an accident.

It should be appreciated and understood that drowsy driving is a major problem in around the world, wherein the risk, danger, and often tragic results of drowsy driving are alarming. Drowsy driving is the dangerous combination of driving and sleepiness or fatigue. This usually happens when a driver has not slept enough, but it can also happen due to untreated sleep disorders, medications, drinking alcohol, or shift work.

No one knows the exact moment when sleep comes over their body. Falling asleep at the wheel is clearly dangerous, but being sleepy affects your ability to drive safely even if you don't fall asleep. Being sleepy at the wheel makes drivers less able to pay attention to the road, slows their reaction time, and affects the driver's ability to make good decisions.

Many of the warning signs of sleepy/drowsy driving can be sensed, those signs include yawning or blinking frequently, difficulty remembering the past few miles, missing an exit, driving from your lane, and hitting a rumble strip on the side of the road.

Although there have been implementations, such as rumble strips, there is not an effective and easily accessible system for aiding in the prevention of sleepy driving. Accordingly, there lies a need for a system and method to alert drivers upon detection of one or more factors that indicate sleepy driving.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
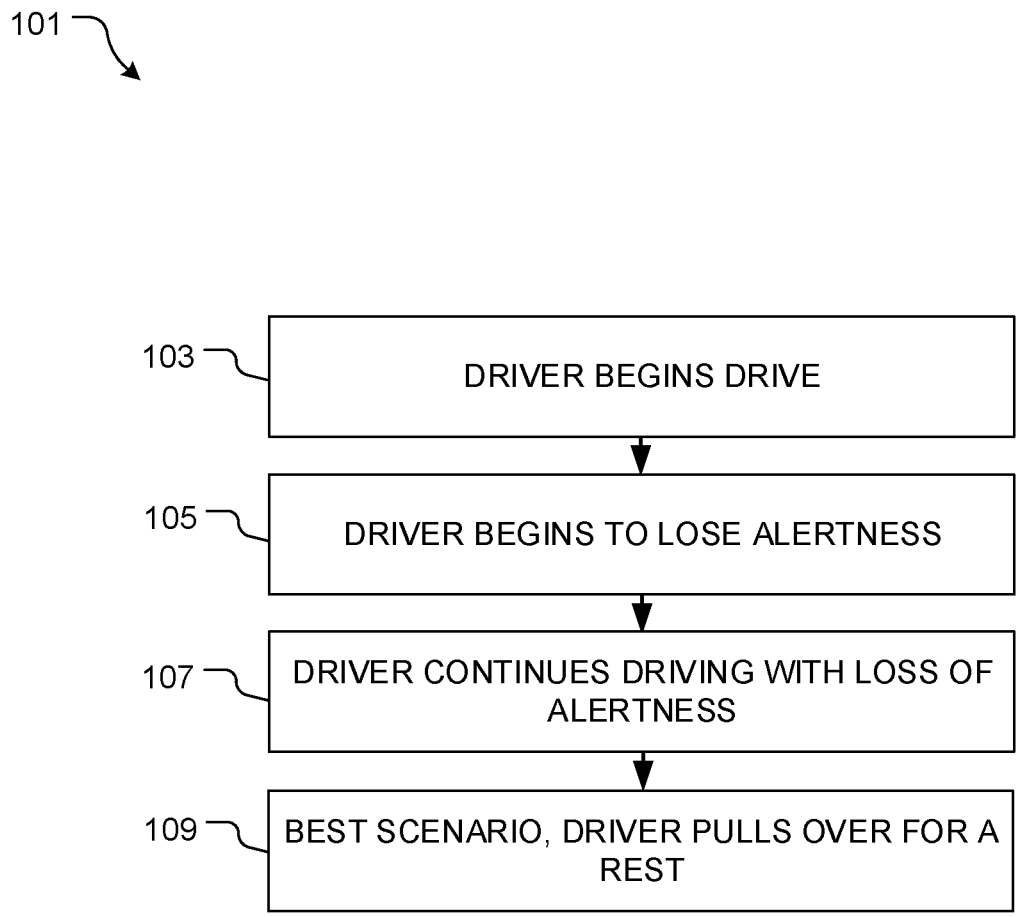
FIG. 1 is a flowchart of a common sleepy driving method.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional driving methods and systems. Specifically, the present invention provides an effective means to detect one or more indicators that a driver is sleepy and provide an alert accordingly, thereby bringing the driver back to an alert stage. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
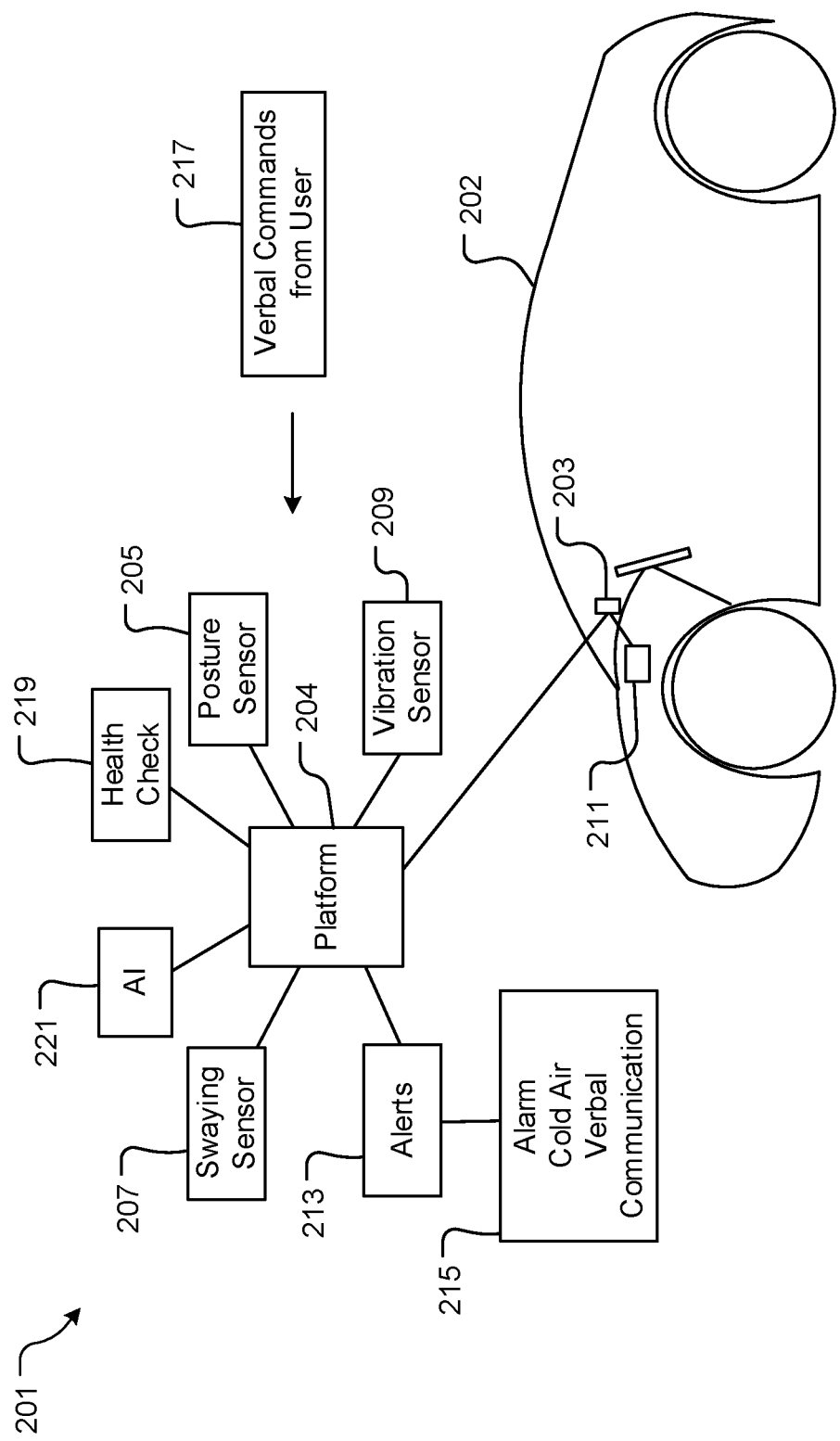
FIG. 2 is a simplified schematic of a sleepy driving alert system in accordance with a preferred embodiment of the present application.

Referring now to the drawings wherein like reference characters identify corresponding or similar elements throughout the several views, FIG. 2 depicts a simplified schematic of a sleepy driver alert system 201 in accordance with a preferred embodiment of the present application. It will be appreciated that system 201 overcomes one or more of the above-listed problems commonly associated with conventional driving methods and systems.

In the contemplated embodiment, system 201 includes a vehicle 202 and a computing device 203, which can be a mobile phone, tablet, vehicle computer, or a stand alone device, configured to communicate via a platform 204 with one or more sensors 205, 207, 209, to receive information necessary to determine if the driver is becoming fatigued during a trip. In some embodiments, such as when the computing device is a phone, the computing device can further be configured to communicate with a vehicle computing system 211 to receive information therefrom.

In one embodiment, a first sensor 205 is a posture sensor configured to read posture of the driver. It is contemplated that this sensor can be configured into a camera, wherein the camera reads head tilt, number of yawns of the driver, slouching posture, and the like, thereby providing data to determine if the driver's posture is within a predetermined range.

Second sensor 207 can be a swaying sensor, configured to detect movement of the vehicle, and determine if the movement is within a predetermined range. The swaying sensor can be built into the computing device, or alternatively, can be a sensor incorporated into the mechanics of the vehicle.

Third sensor 209 can be a vibration sensor configured to detect vibrations of the vehicle 202 such as when the vehicle travels over rumble strip. Again, platform 204 can be configured to detect when the vibrations exceed a predetermined acceptable range.

As shown in FIG. 2, upon detection by one or more of the sensors that one of the indicators, such as posture, is not within the pre-determined range, platform 204 is configured to provide an alert 213 to bring the driver back to a state of awareness. It is contemplated that the alert can be any number of audio, visible, and/or physical alerts 215. As shown, it is contemplated that an audio alarm could sound, the vehicle computer 211 could activate cold air, and/or the computing device can verbally communicate with the user.

It is contemplated that in some embodiments, the user can issue verbal commands and communication 217 with computing device 203, such as providing a location. Further, the verbal alert via the computing device can issue prompts, such as asking the driver to state their name, destination, phone number, exit number, etc. In addition, the verbal alert can ask the driver questions to bring alertness back, such as asking if the driver wants to stop for food, coffee, gas, a rest break, etc.

In some embodiments, platform 204 further includes a health check function 219, wherein the platform 204 is configured to receive information from the user, such as asking the driver for physical symptoms, and then communicating back to the driver possible directives.

In some embodiments, the system can further incorporate the use of artificial intelligence 221, with the aid of sensors such as semiconductor sensors, cameras, or other smart systems, and can be used by any municipality and/or transportation system, wherein other driver awareness systems can communicate with each other, so that the AI technology can receive and process communication outwardly with drivers. In addition, the AI technology can be used to allow the driver to communicate with outside sources, as they see fit, thereby being available to be easily and quickly adjusted.

It should be appreciated that one of the unique features believed characteristic of the present application is the ability of system 201 to sense multiple indications of a sleepy driver and react accordingly to bring the driver back to an alert status.

Figure 3:
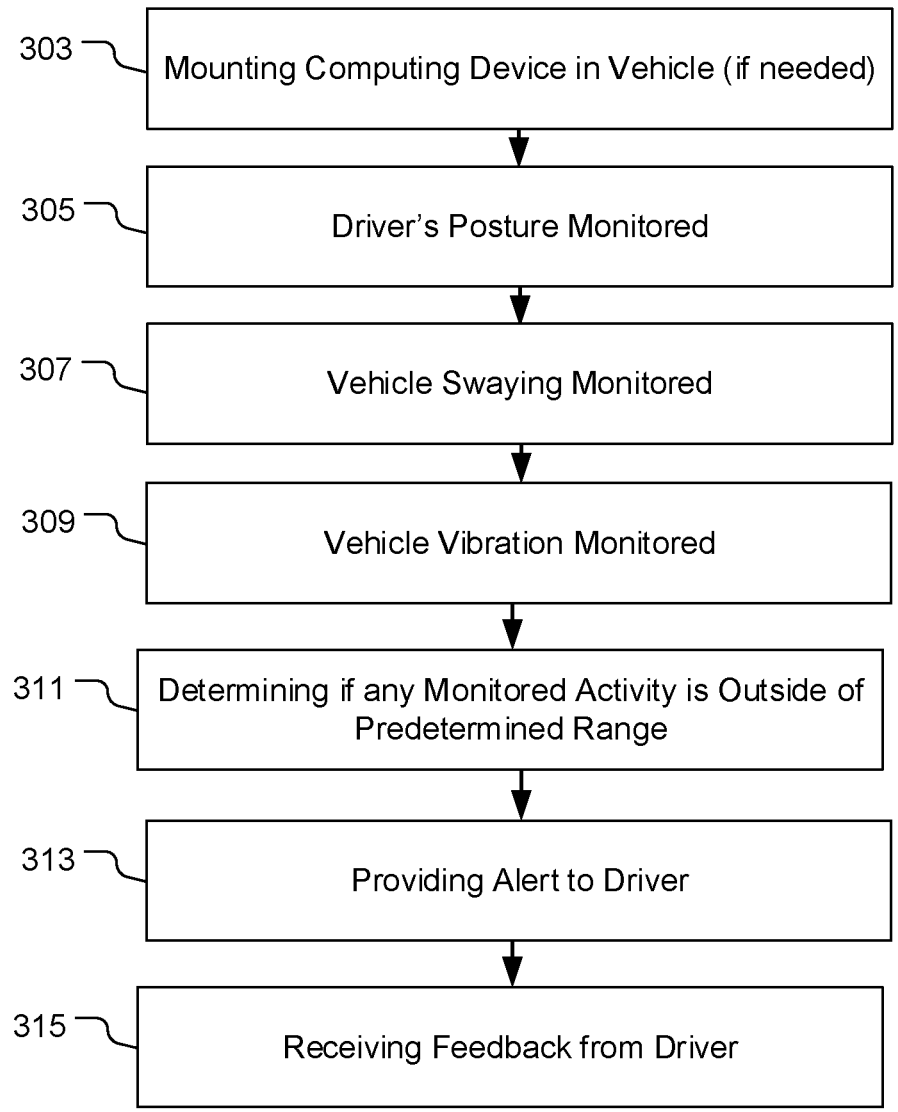
FIG. 3 is a flowchart of the method of use of the system of FIG. 2.

In FIG. 3, a flowchart 301 further depicts the method of system 201. During use, the computing device is mounted into the vehicle as needed, as shown with box 303. It should be appreciated that in some embodiments, mounting is not required, because the device is already incorporated into the vehicle computing system. During use, the driver's posture is monitored, the vehicle's swaying pattern is monitored, and the vehicle vibrations are monitored, as shown with boxes 305, 307, 309. As any of these monitored indications fall outside of the pre-determined range, an alert is triggered to cause the driver to wake up and/or become more alert, as shown with boxes 311, 313. In some embodiments, feedback/verbal communication from the driver is received, as shown with box 315.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A sleepy driver alert method, comprising:
   providing a vehicle with a cold air system;
   providing a platform accessible from a computing device, the platform being configured to communicate with one or more sensors of the vehicle;
   monitoring driver posture via a first sensor in communication with the platform;
   monitoring the vehicle swaying via a second sensor in communication with the platform;
   determining if a driver posture is within a pre-determined normal range;
   determining if the vehicle swaying is within a pre-determined normal range;
   providing an alert via a list of alerts to increase awareness of the driver when the driver posture or the vehicle swaying is not within the predetermined normal ranges;
   activating the cold air system to blow cold air on the driver if the detection of the driver posture and the detection of the vehicle swaying is outside the predetermined normal ranges;
   autonomously communicating between the vehicle and a second vehicle of the driver awareness solely if the driver posture is sensed outside the pre-determined normal range and if the vehicle swaying is sensed outside the pre-determined normal range.

2. The method of claim 1, wherein the list of alerts comprises:
   an audio alarm;
   an activation of cold air from a vehicle; and
   a request for verbal communication from the driver.

3. The method of claim 1, further comprising:
   receiving health check information from the driver, the health check information configured to provide information regarding one or more ailments.

4. The method of claim 1, wherein the determining if driver posture is within a predetermined range includes determining if the driver slouches, yawns, closes their eyes, and tilts their head.

5. The method of claim 1, further comprising:
monitoring for vibrations of the vehicle through a vibration sensor; and
determining if vibrations of the vehicle exceed a predetermined value.

6. The method of claim 1, further comprising:
receiving a verbal command from the driver indicating that the driver is in a state of awareness.

\* \* \* \* \*